United States Patent [19]

Todd et al.

[11] 4,078,571
[45] Mar. 14, 1978

[54] SEPARATING UNIT FOR COMBINE HARVESTERS

[75] Inventors: Robert R. Todd, Leola; Edward W. Rowland-Hill, Lancaster, both of Pa.

[73] Assignee: Sperry Rand Corporation, New Holland, Pa.

[21] Appl. No.: 705,380

[22] Filed: Jul. 14, 1976

[51] Int. Cl.² ............................................. A01F 12/20
[52] U.S. Cl. .................................... 130/27 T; 56/14.6
[58] Field of Search ............. 56/14.6; 130/27 R, 27 T

[56] References Cited

U.S. PATENT DOCUMENTS

| 3,871,384 | 3/1975 | Depauw et al. | 130/27 T |
| 3,982,548 | 9/1976 | Stamp | 130/27 T |

*Primary Examiner*—Russell R. Kinsey
*Attorney, Agent, or Firm*—Frank A. Seemar; John B. Mitchell; Joseph A. Brown

[57] ABSTRACT

A combine harvester comprising at least one generally cylindrical crop handling unit having tandem threshing and separating sections through which material is advanced along a generally helical path. A conveyor is provided for receiving crop material from a forwardly positioned crop header and delivering it axially into the cylindrical unit. During operation, grain is separated from the crop material and discharged through concaves and grates in the threshing and separating sections, respectively, onto a grain pan which in turn deposits it on cleaning sieves located rearwardly of the grain pan. The clean grain is elevated to a storage tank mounted on the combine while the residue is conveyed rearwardly and expelled onto the field. The grate in the separating section is cylindrical in configuration and comprises a plurality of generally transverse members retained by spaced longitudinal rub bars defining a configuration of apertures permitting discharge of grain over most or all of the circumferential surface of the cylindrical unit. One or more of the transverse members have at least one slightly askew section to assist advancement of crop material along its helical path in the separating section of the combine. A portion of the separation grate extends into the threshing section.

16 Claims, 8 Drawing Figures

SEPARATING UNIT FOR COMBINE HARVESTERS

CROSS REFERENCE TO RELATED APPLICATIONS

Reference is hereby made to the following copending U.S. patent application dealing with related subject matter, assigned to the assignee of the present application and filed on or about the same date as the present application:

"Combine Harvester" by E. W. Rowland-Hill; Ser. No. 705,379; filed July 14, 1976.

BACKGROUND OF THE INVENTION

The present invention relates generally to mobile grain harvesting machines and more particularly to an axial flow combine in which improved means are provided for guiding crop materials along a predetermined path.

During field operation of a mobile combine harvester, grain is threshed, separated, cleaned and delivered for transport from the field. Over the past 30 years, the threshing function in most commercially available combines has been carried out by a rotating threshing cylinder, cooperatively associated with a concave extending transversely to the direction of combine travel. Crop material is fed to the forward edge of the concave, and passed along a generally longitudinal path between the concave and rotating cylinder. Some grain is discharged through the concave while the remaining crop material is discharged over the trailing edge of the concave onto straw walkers that extend rearwardly across the combine. Grain, separated from the chaff on the reciprocating walkers is deposited on cleaning sieves and eventually collected and conveyed to a grain tank, while the straw residue is advanced rearwardly and expelled onto the field. This type of harvesting equipment commonly referred to as a conventional combine, is more thoroughly described in the prior art, exemplary of which are U.S. Pat. Nos. 3,411,274 and 3,472,235.

During the lengthy period of mobile combine development many other types of combines have been considered but for the most part with a lesser degree of success than the conventional combine. For example, U.S. Pat. No. 2,825,455, issued Mar. 4, 1958, to W. Streich et al, shows a combine in which a conventional threshing cylinder and concave are utilized in combination with a longitudinally extending rotary drum separator in place of conventional straw walkers. Another example of the many and varied arrangements in the prior art is shown in U.S. Pat. No. 2,811,158 issued Oct. 29, 1957, to O. Rietman. In the Rietman patent, a conventional concave and threshing cylinder are again shown in combination with a separation structure utilizing a drum mounted along an axis aligned with the path of combine travel.

Recently, a new and significantly different combine design has been developed and has met with outstanding commercial success. This combine, described in many patents that have issued over the past several years, comprises two side-by-side generally cylindrical crop handling units each having tandem threshing and separating sections. During operation crop material is conveyed to the crop handling units and thence advanced in a generally axial direction along two separate helical paths in the cylindrical units. Exemplary of this type of axial flow combine is U.S. Pat. No. 3,742,686 issued on July 3, 1973, in the name of E. W. Rowland-Hill and assigned to the assignee of the present application. During operation, grain is separated from crop material and discharged through concaves and grates in the threshing and separating sections, respectively, onto a grain pan below the cylindrical units. The grain is in turn deposited on cleaning sieves and thence elevated by an auger to a storage tank mounted on the combine. Meanwhile, the residue is conveyed rearwardly and expelled onto the field. this design, which has reduced grain losses, minimized grain damage and increased overall capacity and reliability, is believed to be the most efficient high performance commercially avaialbel combine known in the art. Among the many things contributing to this success is the effective utilization of centrifugal force in the separation section. Grain is discharged outwardly through separation grates as the crop material is transferred rearwardly along its axial path.

Combines with a single cylindrical crop handling unit for accomplishing threshing and separating have also been considered in the past. Although this type of combine has been disclosed in various patents it is not commercially available. An example of a single cylinder crop handling machine is shown in U.S. Pat. No. 3,481,343, issued to E. M. Van Buskirk on Dec. 2, 1969. In the Buskirk machine material is fed into the front end and advanced rearwardly in a generally axial direction along a path between a rotating rotor and the cylindrical casing in which tandem threshing and separating sections are embodied. This type of combine is commonly referred to as a single rotor axial flow combine in contradistinction to the double rotor machine described in U.S. Pat. No. 3,742,686, mentioned above.

In prior art axial flow combines, it is common in machines where centrifugal separation is employed for the separating section to discharge material over a limited portion of its area. In the remaining portion of the cylindrical surface area guiding vanes extend from impervious walls to assist in the rearward helical advancement of the crop material during the separation process. Various other prior art arrangements of vanes and crop engaging elements have been utilized to urge material rearwardly along a generally axial path in machines where grain is separated from crop material. Included among these arrangements is a stationary cylindrical corn sheller, shown in U.S. Pat. No. 1,777,992, issued on July 15, 1932, to J. Lizamore, in which material is fed into a hopper and shelled in a separation drum having helical segments to assist in the removal of kernels of corn from the cobs during the shelling process. Another approach is shown in U.S. Pat. No. 2,842,266 issued to E. C. Carlson on July 8, 1958, wherein a cylindrical separation mechanism having internal and external flighting is employed to convey crop material along a path in a generally axial direction.

SUMMARY OF THE INVENTION

The principal object of this invention is to provide an axial flow combine having improved crop advancement means.

Another object of this invention is to provide a mobile threshing and separating machine having at least one generally cylindrical crop handling unit with a threshing section and a tandem separating section providing improved separating and crop handling capabilities.

In pursuance of these and other objects, the present invention contemplates a new and improved combine harvester having at least one rotor axially mounted in a generally cylindrical crop handling unit having a threshing section and an axially aligned separating section including a grate disposed rearwardly of the threshing section to receive crop material from the threshing section and in conjunction with the rotor guide the crop material along a helical path during which grain is separated from the crop material and discharged through the grate.

In one embodiment, the combine harvester comprises a mobile frame adapted to be propelled over a field of grain bearing crop material, a header carried by the frame for removing the crop material from the field and delivering it in a generally rearward direction, a conveyor mounted on the frame for receiving crop material from the header and conveying it in a generally rearward direction, at least one generally cylindrical crop handling unit for receiving material from the conveyor, the unit extending generally in a fore-and-aft direction and having a threshing section with a transversely curved concave and a separating section rearward of the concave. A grain pan extends underneath at least a portion of the cylindrical unit. A fore-and-aft extending rotor is rotatably mounted in the cylindrical unit having threshing elements mounted thereon adjacent the concave and crop engaging elements in the separating section, the cylindrical walls of the latter comprising a unique grate adapted to guide crop material while enhancing grain separation over a substantial portion of the circumference of the cylindrical unit. More specifically, the crop engaging elements urge material rearwardly in the separating section while centrifugally propelling it against a cylindrical grate adapted to permit the discharge of grain outwardly therethrough, the direction of such discharge being determined by the radial position at which grain is dislodged from the crop material as it is being conveyed rearwardly along a helical path through the separating section, all of such grain so discharged being free to eventually gravitate to the grain pan. The grate includes transverse members slightly askew with respect to the rotor axis and in a direction adapted to guide crop material along its helical path.

Still further the present invention contemplates an axial flow combine for processing crop material along a helical path. A rotor is mounted in a generally cylindrical crop handling unit having a forward threshing concave and an axially aligned rearward separating section. A generally cylindrical grate having slightly askew transverse members is provided in the separation section through which crop material is discharged. A separation grate also having slightly askew transverse members extends into the threshing section along the helical path of crop material subsequent to its final traversal of the threshing concave. As a still further enhancement of the present invention the rotor is provided with spirally disposed threshing elements and/or spirally disposed crop engaging elements in the separation section which elements are arranged to urge crop material rearwardly along a helical path in cooperation with the slightly askew transverse members in the separation grates and grate extensions.

DETAILED DESCRIPTION OF THE PREFERRED EMBODIMENT GENERAL

In the following description the invention is set forth in association with a self-propelled combine harvester. However, it should be noted that the invention can also be used in other forms of threshing machines, such as for example, a combine adapted to be pulled behind a tractor with power for the combine derived via a suitable PTO arrangement. Also, as is common in the agricultural art, right-hand and left-hand reference is determined by standing to the rear of the combine harvester and facing the direction of travel. Again, with respect to terminology, the terms crop material, grain and straw are used throughout this specification, but is is not intended that they be limiting in any sense. The term crop material is used to refer to crops in general whether standing or cut and in various stages of processing, the term grain refers to that part of the crop material that may be threshed by the mechanism described herein, and straw refers to all discardable crop material, e.g., chaff.

Figure 1:
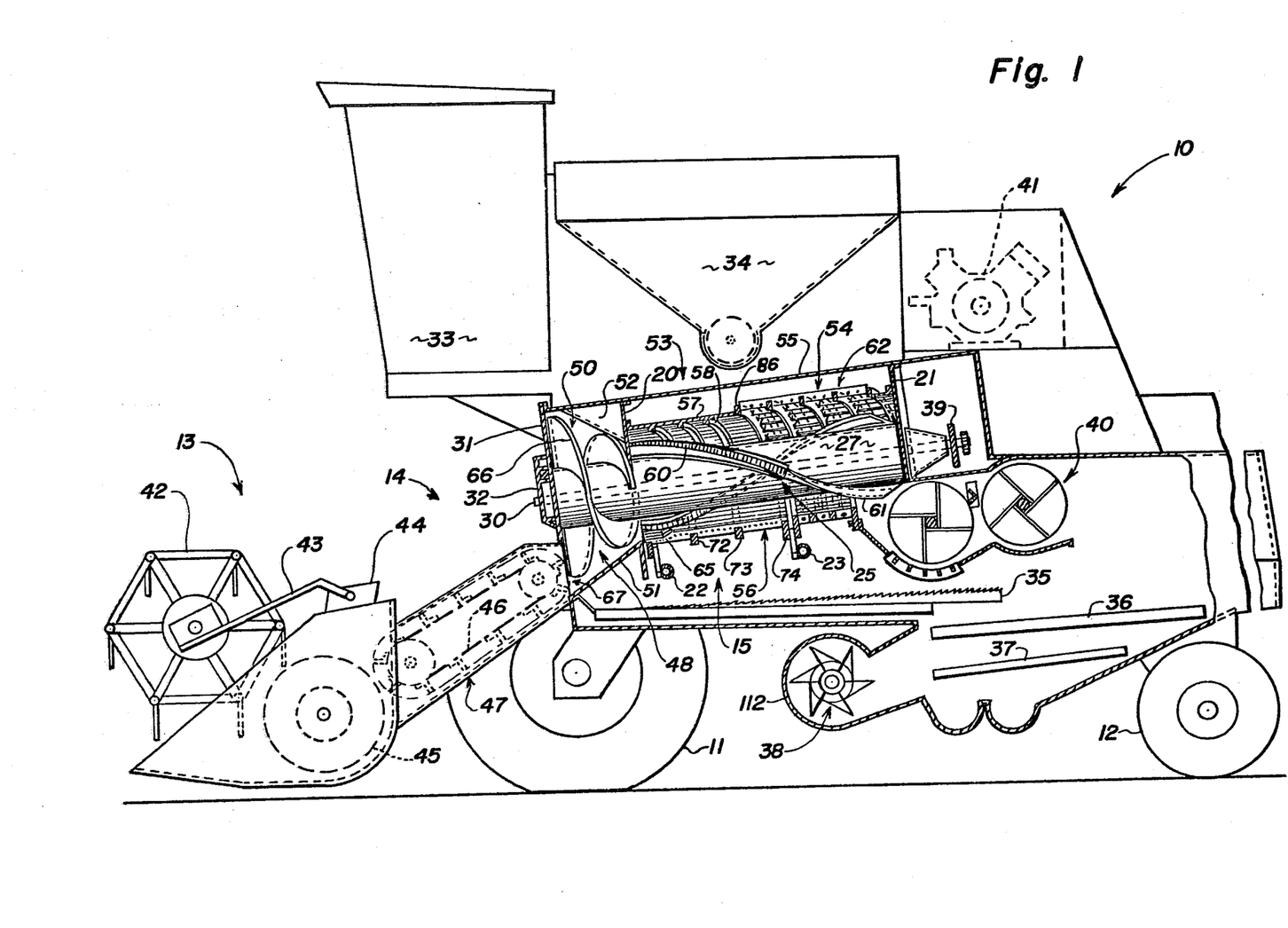
FIG. 1 is a diagrammatic partly sectional side view of a combine harvester in which the principles of the present invention are embodied.

Referring to the drawings for a more detailed description, a combine harvester, generally designated by reference numeral 10, is shown in FIG. 1 to illustrate by way of example, one arrangement in which the principles of the present invention may be employed. Combine 10 is a mobile main frame supported on a pair of front drive wheels 11 and a pair of rear steerable wheel 12, both pairs of which are illustrated by one wheel of a transversely spaced apart pair extending from opposite sides of the frame in a conventional manner. A crop gathering header 13 and an elevator 14 extend forwardly of the main frame. It is not uncommon to adjustably secure the header and elevator to the frame for selective vertical positioning controlled by means of standard hydraulic mechanisms (not shown). The combine 10 further includes a pair of longitudinally extending generally cylindrical crop handling units, the left one of which is designated by reference numeral 15 and is shown in elevation in FIGS. 1 and 2. Unit 15 and a similar right unit 16 (see FIG. 3), carried by the frame between side walls 17 and 18, are supportably mounted at their forward and rearward ends by upright frame members 20 and 21, respectively (FIGS. 1 and 2), and transversely extending beams 22 and 23, secured by suitable means to the frame in the vicinity of the side walls.

Similar right and left longitudinally extending rotors, designated respectively by reference numbers 24 and 25 (FIG. 3) are disposed coaxially within each of the cylindrical units. The left rotor 25 is clearly depicted in elevation in FIG. 1. Each rotor includes a tubular core 26 and 27 mounted on shafts 28,30 the forward ends of which extend through a front wall 31 and are suitably journalled within a transverse beam 32 secured to wall 31. The rear ends of the shafts extend through upright frame member 21 and are journalled in a transverse member 39 supported by the frame between side walls 17,18.

Completing the general combine configuration is an operator's platform 33, a grain tank 34, a grain pan 35, cleaning sieves 36,37, a fan 38 and a straw discharge assembly 40 all of which are also mounted by conventional means on the frame. The various driven components of combine 10 are powered by a standard power source 41 (shown in phantom) which customarily takes the form of an internal combustion engine.

Now turning to a more detailed description of the assemblies mentioned above, combine 10, adapted to be propelled forwardly over a field of grain bearing crop material, includes a conventional cutter (not shown) on header 13. The header illustrated in FIG. 1 is of the grain type, however, it should be noted that other forms of headers may be employed as for example, a pickup for windrowed crop material, a corn header with a plurality of individual side-by-side row units for cutting and gathering corn or other row crops, etc. The grain header 13 shown is provided with a reel 42 carried by a support 43 which is usually adjustably mounted on the header frame 44 by suitable means to provide for selective height control with respect to the field surface over which the combine is propelled. Reel 42 is adapted to rotate in counterclockwise direction to urge crop material into the abovementioned cutter means mounted on the header. A conventional consolidating auger 45 laterally conveys severed crop material to the center of the header whereupon it is discharged rearwardly to the crop elevator. A conveyor 46 is provided within a housing 47 for conveying material rearwardly and upwardly from the header to an infeed section 48 of the combine.

Figure 2:
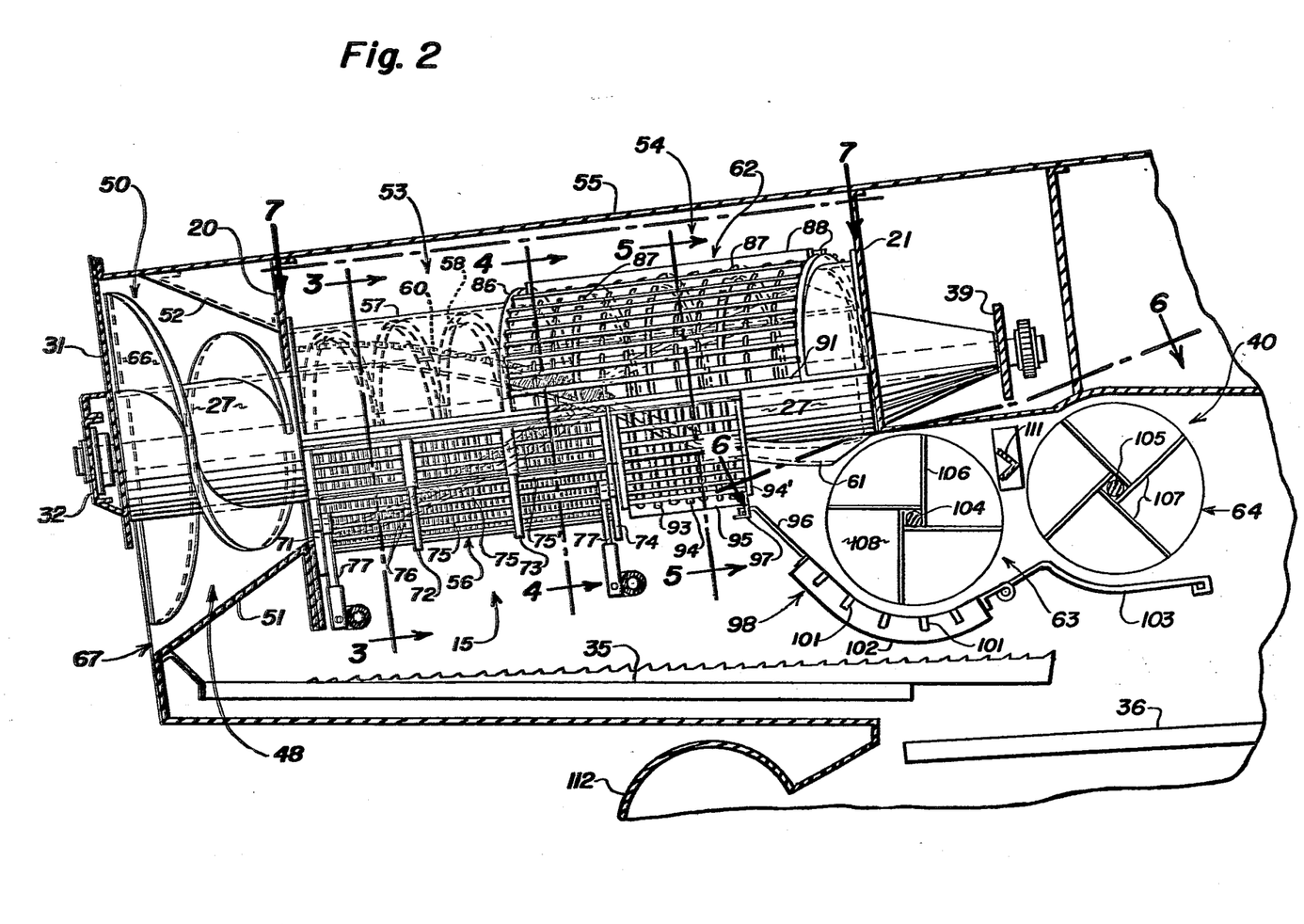
FIG. 2 is an enlarged partly sectional side view of the combine shown in FIG. 1 with the left crop handling unit shown in detail.
Figure 3:
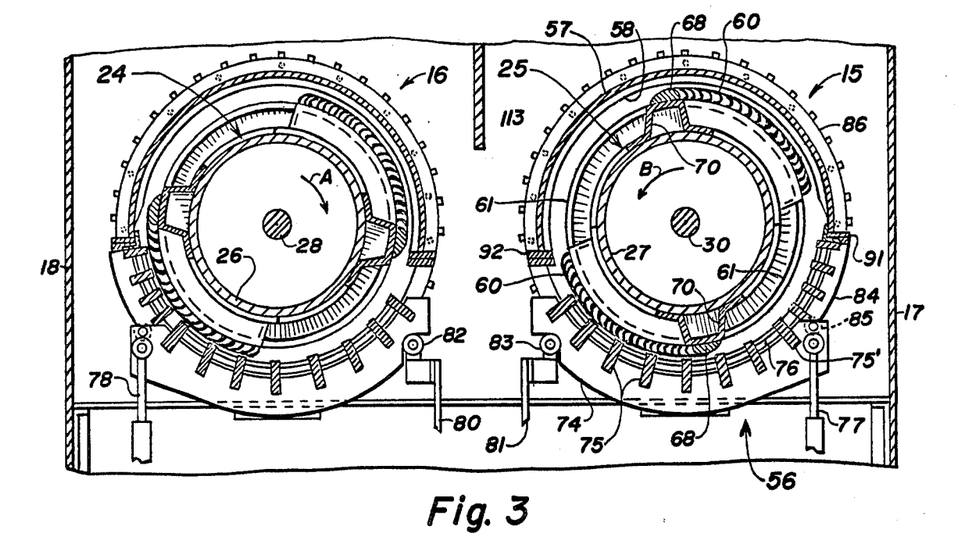
FIG. 3 is an enlarged cross-sectional view taken along lines 3—3 of FIG. 2.

Material conveyed from the elevator conveyor 46 to crop handling units 15,16 via infeed section 48 is urged rearwardly by side-by-side infeed augers, the left one of which is shown and referred to by reference numeral 50 (see FIGS. 1 and 2). Auger flighting extends from the forward portion of the core of each rotor in infeed section 48 defined by bottom wall 51 and top member 52 formed to aid the convergence of material rearwardly toward each respective cylindrical crop handling unit. Specific features of the infeed auger portion of the rotor can best be appreciated from a study of U.S. Patent Application Ser. No. 632,547 filed on Nov. 17, 1975, now issued as U.S. Pat. No. 3,994,303 on Nov. 30, 1976, in the name of E. W. Rowland-Hill and assigned to the assignee of the present application. In the crop handling units, material ia threshed and separated, that is to say, crop material such as wheat, corn, rice, soy beans, etc, is rubbed, flailed or beaten whereupon grain is first removed and then separated from the stalks, cobs or other dischardable crop material.

More specifically, each crop handling unit includes a threshing section 53 and a separating section 54 within respective longitudinal casings having generally cylindrical configurations disposed in parallel side-by-side relation with axes lying in a fore-and-aft plane. The units are inclined slightly upwardly toward the rear with the fore-and-aft plane transversely parallel to the ground. Each unit is open at its forward end to receive unthreshed crop material from an infeed auger. At the rearward end of each unit an opening is provided for straw discharge via discharge assembly 40. Thus, unit 15 comprises threshing and separating sections in the forward and rearward ends thereof, respectively, which extend in tandem along the length of the units. The side walls 17,18 and a top wall 55 of the main frame extend longitudinally and in conjunction with grain pan 35 form a single generally enclosed compartment for both cylindrical units.

The threshing sections more specifically each comprise a transversely curved longitudinally extending concave 56 along the bottom of the unit and transversely curved upper casing 57 having spirally positioned guide vanes 58 extending inwardly therefrom. In one area of the threshing section an auxiliary separation grate (discussed in further detail below) extends above the concave. The separation sections each extend rearwardly from an adjacent forward threshing section and comprise a grate assembly forming a cylindrical continuation over the remaining portion of the unit, the structure of which is described in detail below. Mounted in cooperative relationship with each threshing section on the forward portion of the core of each rotor is a longitudinally extending spiral rasp bar 60 adapted to engage crop material fed into the casing from infeed auger 50. A crop engaging blade 61 mounted in a spiral fashion on the rear portion of the core 27 of rotor 25 cooperates with the separation section to urge material rearwardly along a sprial path. An important function of rasp bar 60 and blade 61 is to impart centrifugal force to the material as it is being urged along its spiral path under conditions where the rotor is rotated.

In the threshing section crop material is threshed and a portion of the grain is separated from the straw and discharged through concave 56 and the auxiliary separation grate to grain pan 35. The remaining portion of the grain will be conveyed rearwardly with the straw. Separation of such entrained grain will take place within the separation section. The straw is finally discharged from the rear of the separation section into discharge assembly 40 wherein still further separation takes place via a grate 98. Eventually crop residue is propelled rearwardly by discharge beaters 63 and 64 and expelled onto the ground along the path of the combine. Meanwhile grain separated from the straw gravitates onto grain pan 35 and thence is vibrated rearwardly to cleaning sieves 36 and 37 in a conventional manner. The cleaned grain is ultimately elevated into grain tank 34 by means of a grain elevator.

It should be noted at this point, that although the right and left hand portions of the combine each have feed augers, rotors, threshing sections, separating sections and discharge sections, because of the similarity in structure, only the left unit will be described in detail for the most part in the remainder of this description.

FEEDING AND THRESHING

Infeed auger 50 in feed section 48 is of the double helical flighting type and is selectively rotated at varying speeds between approximately 280 to 1800 RPM's to feed different types of crop material in a generally axial direction to threshing section 53. In FIG. 1, the concave, cylindrical casing and grate of the crop handling unit is broke away to clearly illustrate the rotor structure, whereas in FIG. 2 the complete cylindrical unit is clearly depicted and the enclosed rotor is shown only in phantom. Now referring to FIG. 3, a sectional view taken through the threshing section 53 of the crop handling unit shows the configuration of the concave and upper casing in relation to rotors 24,25. In the front end of the threshing section a relief portion 65 (FIG. 1) in the concave 56 is provided to facilitate entry of crop material from the feed section 48 to the threshing section 53. This particular feature is not a material part of the present invention and can best be appreciated from a study of U.S. patent application Ser. No. 641,220 filed Dec. 16, 1975 now issued as U.S. Pat. No. 3,995,645 on Dec. 7, 1976, in the name of E. W. Rowland-Hill and assigned to the assignee of the present application.

As mentioned above, the speed of rotation of the rotors depends on the type and nature of crop material being handled. As can be seen in FIGS. 1 and 2 flighting 66 of infeed auger 50 is wound in a direction that will feed material to the rear when rotated in a direction such that the inner portion of the flighting is traveling downwardly when it is adjacent the companion rotor. The augers are enclosed by sides (not shown), front wall member 31, top member 52 and bottom wall 51; all of which form an enclosed generally rearwardly converging infeed section 48 in which the infeed auger urges material rearwardly to threshing section 53. During operation of the combine, the auger is adapted to receive unthreshed crop material from conveyor 46 of elevator 14 through an inlet opening 67 through front wall 31. As the auger 50 rotates, unthreshed crop material will be fed to and drawn in by the flighting from a bottom direction over bottom wall 51.

Now turning to threshing section 53 of the cylindrical crop handling unit 15, a continuous generally cylindrical structure encloses the rotor and comprises an impervious upper casing 57 and arcuate shaped concave 56. A plurality of guide vanes 58 project inwardly from the wall of upper casing 57 along a generally spiral path for the purpose of guiding crop material rearwardly along its axial path in a helical fashion. The portion of the rotor in the threshing section comprises diametrically opposed threshing elements or rasp bars 60 spirally mounted in a spaced apart relation on the periphery of tubular core 27 of the rotor. Each rasp bar comprises a plurality of formed side-by-side rasps 68 (one of which is shown in cross section for each bar in FIGS. 3 and 4) supported by a support element 70 affixed to the outer surface of tubular core member 27.

The concave 56 includes a series of parallel arcuately shaped transversely extending support members 71,72,73 and 74, joined together by longitudinally extending parallel concave bars 75 welded thereto and extending above the upper edge of the supporting members to provide for threshing action in cooperation with the rasp bars on rotor 25. One of the concave bars forms an outer side edge of the concave, this bar being indicated by reference numeral 75'. All of the concave bars 75 and 75' are provided with a series of aligned apertures through which curved rods or wires 76 are mounted. The wires may be arranged in varying spaced lateral and radial relation. By removing and repositioning the wires selective arrays may be achieved to accommodate varying crop materials and conditions. This type of concave configuration is clearly described in U.S. Pat. No. 3,696,815 mentioned above.

The concaves 56 are adapted to be vertically shifted with respect to rotor 25. Such vertical shifting is common to provide for the threshing of a variety of different crops. Thus, for example, corn would require a greater spacing between the rotor and concave then would grass seed. The means to adjust the concaves vertically is not material to the present invention but may be of the type more fully illustrated in U.S. Pat. No. 3,631,862 issued Jan. 4, 1972, in the name of E. W. Rowland-Hill and assigned to the assignee of the present application. It should suffice to note that outer support rods 77,78 (see FIG. 3) are vertically adjustable and inner support rods 80,81 are fixed to provide vertical adjustment by varying the vertical height of rods 77,78. The rearward support member 74 is accordingly pivoted about rollers 82,83. A similar arrangement of vertical support rods and rollers is also provided at the forward end of concave 56. It can be noted that these supporting rods are affixed to transversely extending beams 22,23 which support the overall concave structure by means of securement to the appropriate side frame members.

Concaves extension members 84 (FIGS. 3 and 4) which consist of a similar arrangement of rods and concave bars extend upwardly from concave bar 75' along the side of the cylindrical casing. These concave extensions are mounted to move vertically with the concaves to vary the spacing of the extensions as well as the concave itself under conditions where support rods 77,78 are shifted. To this end, pivotal securement means 85 are provided at the upper outer corner of transversely extending member 74.

Lastly with respect to the threshing section, an auxiliary grate is provided having structure of a nature similar to the grate in the separating section described below and, therefore, will not be given specific treatment during discussion of the infeed and threshing sections. This auxiliary grate portion is shown in detail in FIG. 4. It commences at the upper edge of concave extension 84 and continues over the top of the casing to terminate at the upper edge of the inner portion of concave 56. It is affixed to the upper casing of the threshing section by a transverse frame member 86 disposed along a generally spiral path.

The rasp bars of the rotors may be positioned for passing across the concaves at a point of adjacency with its corresponding rotor at the same time. However, it has been learned in practice that it is preferable that one rotor thresh at a different time than the corresponding portion of the adjacent rotor. This is clearly depicted by the positional relationship of the rasp bars shown in section in FIG. 3. The rotors are positioned so that a particular rasp segment of one rasp bar is just initiating engagement with concave 56 at such time as the corresponding rasp segment of the rasp bar of the adjacent threshing portion section is in cooperative relationship with the approximate center of the corresponding concave. By driving the rotors in the directions shown by arrows "a" and "b" (FIG. 3) the rotors are maintained in angularly offset and out of phase relationship so that respective threshing traversals of the rotors commence and terminate at different times. In this way, only one of the rotors will be initiating contact with material in the concave area at any one time and thus a reduced horsepower requirement can be realized.

SEPARATION

Figures 4, 5:
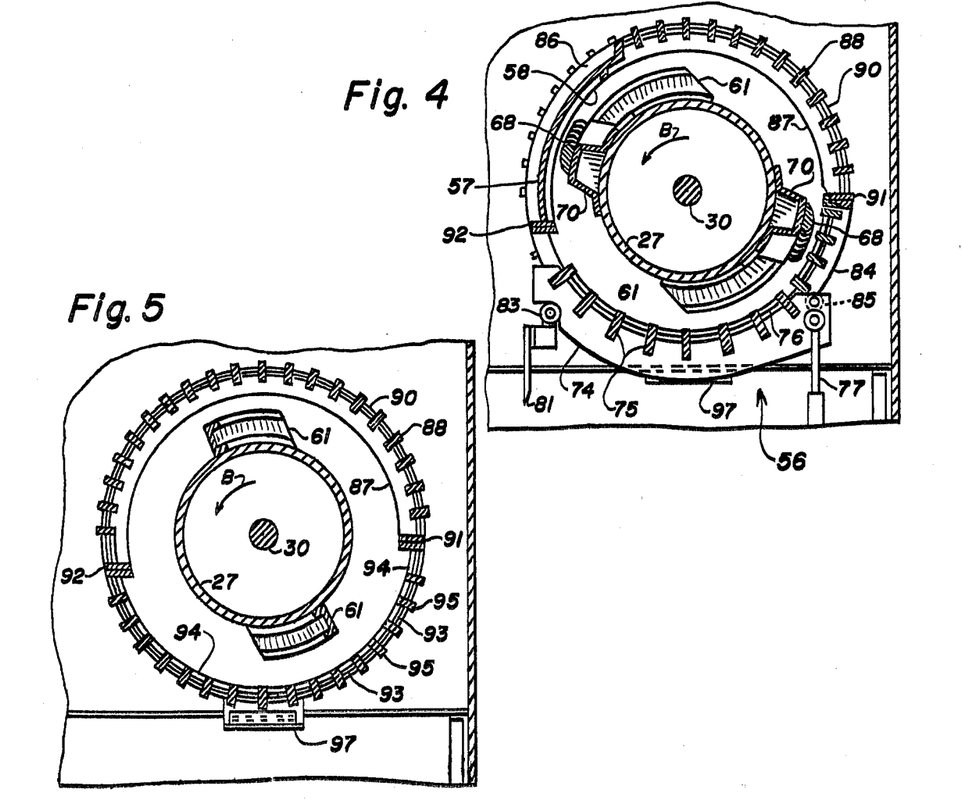
FIG. 4 is an enlarged cross-sectional view taken along lines 4—4 of FIG. 2.
FIG. 5 is an enlarged cross-sectional view taken along lines 5—5 of FIG. 2
Figure 8:
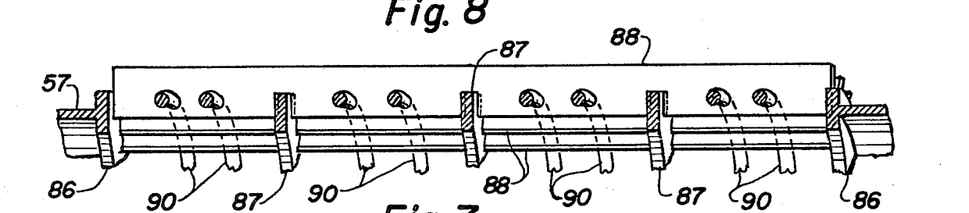
FIG. 8 is a cross-sectional view taken along lines 8—8 of FIG. 7.

Rearward of threshing section 53 is separation section 54. Mounted on tubular core 27 for rotation with shaft 30 are diametrically opposed pairs of crop engaging blades 61 mounted along a continuation of the spiral path of rasp bars 60. Each blade is generally C-shaped in cross section as depicted in FIG. 5. Although this shape has been found to be satisfactory, it should be understood that other blade configurations could be substituted without having any effect on the general performance and principal function of the blade which is to urge crop material along its rearward helical path in the cylindrical units while imparting a centrifugal force thereto. The forward portions of the blades 61 cooperate with the separation grates to separate grain from the crop material as discussed in further detail hereinbelow. The grates generally have a wider mesh than concaves 56 and concave extensions 84. More specifically, the separation grates comprise upper and lower sections, the former of which extends from a position generally above the concave. A forward portion of the upper section is referred to as an auxiliary grate. The overall upper portion of the grate consists generally of a plurality of axially spaced side-by-side transverse members 87 and a series of spaced longitudinal rub elements 88 extending between the transverse grate members 87 to provide a configuration of apertures through which separated grain may pass. A plurality of rod members 90 extend through elements 88 in side-by-side fashion between the transverse grate members. The planar grate members 87 are disposed between a lower extremity frame member 91 on the outer surface of the generally cylindrical casing and an inner frame member 92 on the inner surface of the cylindrical unit. The transverse members 87 are disposed in a slightly askew fashion. A configuration is realized which corresponds generally to the spiral configuration of vanes 58 in the threshing section. Thus these planar askew elements which extend inwardly beyond the inner edge of longitudinal elements 88, as shown in the sectional view in FIG. 8, provide a continuation of the guiding vanes to assist in rearward guidance of crop material along a generally helical path through the cylindrical crop handling unit. The lower section of the separating grate consists of a similar array of side-by-side lower rods 93 and lowr transverse members 94. A plurality of parallel longitudinal rub elements 95 are provided in the lower section to complete a similar mesh as is provided by the upper section. In the lower section the transverse members 94 are parallel to the concave bars and are disposed alternately with rods 93 mounted through a plurality of parallel rub elements 95. Although the transverse members 94 in the lower section of the separation grate could also be disposed in an askew fashion it has been determined that it is more effective for the majority of crop materials and conditions to utilize transverse members in a plane perpendicular to the axis of the rotors.

It should be pointed out with respect to the separating section that the configuration of rods and transverse members in the upper portion and lower portion are merely for exemplary purposes and can be varied with respect to spacing, size and configuration to accommodate different types of crop materials that may be handled by the combine. These changes can be effected by utilizing interchangeable separating sections or alternatively various size rods can be selectively threaded through the holes in the longitudinal elements. Therefore, although the preferred embodiment shows apertures in the upper portion which are larger than the apertures in the lower portion formed by transverse members 94 and rods 93, it is possibel under certain conditions to use grates having similar upper and lower spacing or under other conditions a relationship opposite to that shown could be desirable, i.e., apertures in the upper portion smaller than apertures in the lower portion.

CLEANING AND DISCHARGE

As shown in FIG. 2, a discharge opening in the rear portion of the separating section is defined by the rear edge of transverse member 94'of the lower portion of the separating grate and the lower edge of the upper portion of the separating grate. This opening permits discharge of crop material to the straw discharge assembly 40. Thus, when material being carried around the rotor reaches the rear portion of the separating section, it is propelled by crop engaging blades 61 out of the opening and downwardly toward the first discharge beater 63.

Figure 6:
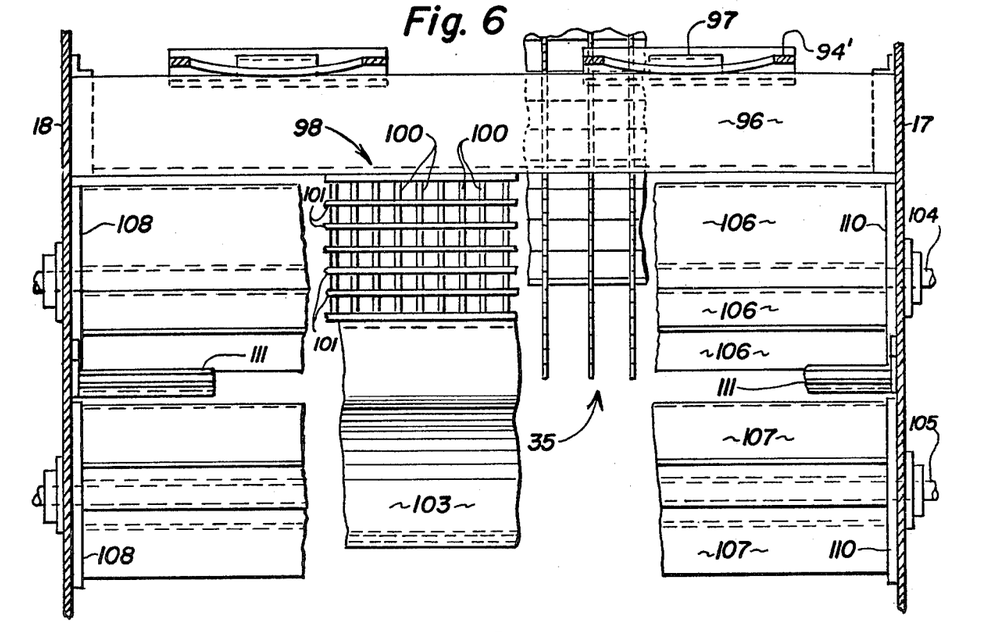
FIG. 6 is a partly fragmented view taken along lines 6—6 of FIG. 2.
Figure 7:
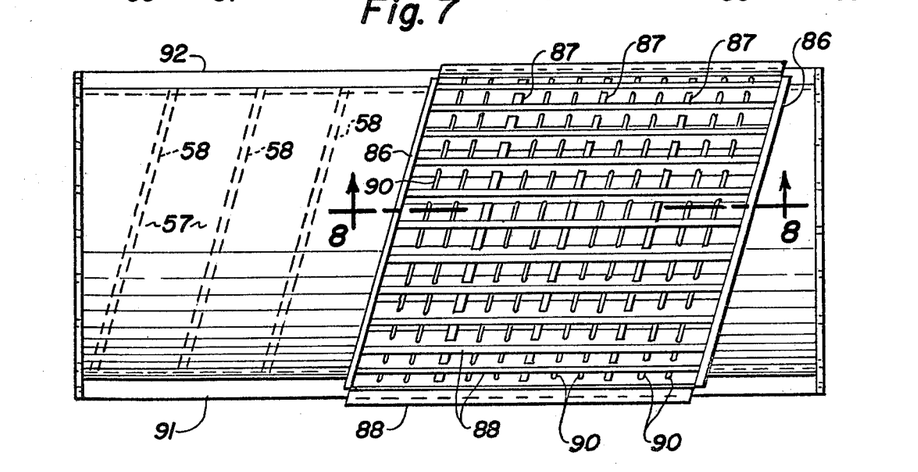
FIG. 7 is a plan view taken along lines 7—7 of FIG. 2.

A ramp member 96 extends rearwardly and downwardly from a supporting bracket 97 secured to the lower portion of the lower section of the separating grate. The ramp member 96 (shown clearly in FIG. 6) extends rearwardly to the forward edge portion of an arcuately shaped auxiliary grate assembly 98 mounted between the first discharge beater 63 and grain pan 35. An appropriate mesh is provided by arcuate shaped rod members 100 (FIG. 6) extending through transverse rub members 101 and in parallel relation to side elements 102 shown in FIG. 2. A transition member 103 is attached to the rear edge of the auxiliary grate to provide a continuation of the surface over which straw material is passed rearwardly to a second discharge beater 64. Discharge beaters 63,64 are of similar construction and comprise transverse shafts 104, 105 journalled in side walls 17,18 (see FIG. 6) and adapted for appropriate coupling (not shown) to the power source for rotation in a counterclockwise direction. The discharge assemblies further comprise four symmetrically arranged paddles 106,107 extending between circular side supports 108,110 (beater 63) in a generally radially outward direction. Completing the straw discharge assembly is a stripper element 111 having an angle cross section and adapted to prevent material from wrapping around the first discharge beater 63, whereupon straw is stripped and passed to the second discharge beater along its generally rearward path.

Grain that gravitates through the cylindrical units and auxiliary beater discharge grate 98 comes to rest on grain pan 35. The configuration of this grain pan is of a conventional nature as illustrated in part by the cut away viewing in FIG. 6. Reciprocal motion of the grain pan causes material to be urged rearwardly and dropped off the rear edge of the grain pan onto upper cleaning sieve 36. The upper sieve 36 commonly referred to as a chaffer sieve is provided with means whereby the apertures in the sieve can be adjusted so that grain received on the sieve may fall through the sieve while the trash is shaken rearwardly by appropriate reciprocal motion for discharge. In a like conventional manner, the lighter chaff also is blown rearwardly by means of fan 38 operatively mounted in an appropriate fan housing 112. The lower sieve 37, commonly referred to as a grain sieve, is provided with apertures which permit only grass to ultimately pass through to grain collecting elements, depicted in the FIG. 1 configuration in a pictorial manner for the purposes of this invention. The chaffer sieve, grain sieve and grain handlng means are all of a conventional nature and further description are felt to be unnecessary.

OPERATION AND ADVANTAGES

In operation, crop material is fed from header 13 via elevator 14 and infeed section 48 to a pair of cylindrical crop handling units 15 and 16. Crop material is fed to threshing and separating sections of each cylindrical unit in a parallel side-by-side manner via a pair of infeed augers in the infeed section 48 of the combine. In each threshing section, situated at the forward end of the cylindrical unit, crop material is fed in a generally longitudinal or axial direction into the space between the tubular core portion of the rotor and the relieved portion 65 of each respective concave. Material is then urged along a helical path by the spiral rasp bars 60, which brings about threshing of the crop against concaves 56 thereby loosening grain kernels and discharging a substantial portion thereof through openings in the concave. During travel of material along its helical path adjacent the upper casing 57, it engages vanes 58 disposed to aid in the guidance thereof. As material continues along its rearward generally helical path it makes multiple passes past the concaves for further threshing of the grain until finally in its last pass adjacent the concaves it travels immediately past the auxiliary separating section of the separator grate. Thus, the material which is in the form of a mat passes repeatedly across the concaves for successive threshing and thereby minimizing grain lossage.

In the separating section of each cylindrical unit, the mat continues along its helical path and is guided by blades 61 in conjunction with the lateral support members of the separating grate which members are disposed in a plane slightly askew to the rotor axis. Immediately following the last pass of the mat of crop material over the concave it engages the auxiliary separator grate without passing over any further solid portions of the casing. This thereby exposes the mat immediately to the separator guide grate and enhances the overall effectiveness of the combine. In the next portion of the separating section the lower grate section and the upper grate section form a complete cylindrical separating grate to which material is exposed as it is urged rearwardly along its helical path by crop engaging blades 61 in cooperation with the askew transverse members of the upper grate section. In this area of the separating section grain is continuously separated from the straw by gravity and centrifugal force resulting in grain discharge through the apertures in the grate over the full circumference of the unit. The straw which is in the form of a mat continues to be moved rearwardly whereupon the straw or remaining residue of crop material, subsequent to its last pass through the separating section, reaches the discharge area and is spilled downwardly into the straw discharge assembly. The straw mat is then reoriented, i.e., changed from a spiral path to a longitudinal path via beaters 63 and 64. In this reoriented position the straw mat than engages auxiliary grate 78 and an additional portion of the grain in the straw is dislodged and discharged through the apertures in the grate to grain pan 35.

Meanwhile the grain that has been previously discharged through the separating and threshing sections of the cylindrical crop handling unit has gravitated to the grain pan and is also being conveyed rearwardly by means of a shaking motion. Ultimately the grain is discharged from the grain pan and falls on the cleaning sieves and is eventually deposited in appropriate crop grain handling means for transport to the grain tank.

More specifically, in the separating section grain is discharged via the separation grate over a full 360° of the circumference of the crop handling unit. The upper and lower portions of the separating section are continuous from the rearward end of the concave to the forward end of the discharge opening adjacent the straw discharge assembly. During separation the downward movement of the rotors at their position of adjacency at the center produce a discharge of grain in a generally uniform precipitation pattern which may increase slightly in density at the center of each rotor and then again increase slightly toward the outer walls of the enclosure means. These slight variations vary from crop to crop. Thus, grain is discharged through the apertures in the grate during rotation of the rotor which imparts a centrifugal force to the crop material to effect separation over the full circumference of the separating section. Grain is discharged outwardly through the grate toward the sides and top walls as well as toward the grain pan underneath. The direction of discharge is determined by the radial position at which the grain is dislodged from the mat of crop material as it is being conveyed rearwardly through the separating section by virtue of the rotative action of the blades disposed in a spiral path.

While the grain discharged is eventually free to gravitate to the grain pan by virtue of the spaced relation of the cylindrical units with the various enclosing means, some of the material being discharged upwardly impinges against the upper wall of the enclosure and deflects back toward the grates. In these instances the air flow being forced out of the grate merely causes it to either contact deflector plate 113 and gravitate down through the center of the two rotor units or merely cause it to intermingle with the material as it is being passed down along the side of the unit to the grain pan in the vicinity of the side wall. Various other configurations of deflector means can be utilized to direct separated crop material to gravitate to the pan in desirable patterns. For example, in some crop conditions a deflector has been used in the form of a V-shaped cross-section extending with its apex down from the top wall above the center of the rotor.

Therefore, the unique arrangements contemplated by the present invention present a combine in which a better throughput of material is provided and, therefore, an overall enhancement of the harvesting speed is realized. In addition to the many known advantages of a dual rotor concept, the present machine provides in addition the feature of a continuous separation of the crop material in each separating section over a substantial portion of the circumference of each cylindrical crop handling unit, both being located in a common compartment and having a common grain pan.

Further, in the terms of time, each mat of crop material can be completely processed during a shorter relative period by virtue of the fact that it is continuously exposed to a separation grate after it has completed its passes over the concave. This improved configuration improves separation capacity and thereby permits the reduction in length of the rotor and an attendant saving in cost as well as a reduction in overall weight of the machine. These features also give rise to improvement in the maneuverability and ease in which the combine can be transported and stored.

The space relation of the rotors permits an improved precipitation pattern of the grain over an area underneath the rotors whereby the grain is effectively intermingled and evenly distributed on the grain pan. Likewise, the space between the rotors and the side and top walls of the enclosure permits material to precipitate in a generally even pattern and thus enhances operation of the cleaning sieves which in turn receives the material from the grain pan in an even fashion. Thus, as either implicitly or explicitly set forth above the movement of grain through the cylindrical unit is more rapid due to the possibility of a shorter length of the overall rotor configuration as a result of the improved separation structure. The rotor members are permitted to agitate the mat and thereby dislodge entrained grain and expose it to apertures of a separation grate as it passes over all or a substantial portion of its full 360° circumference. This separation improvement is further enhanced by an auxiliary grate portion which commences from the upper edge of the concave extension subsequent to the last pass of the mat over the concave and thus obviating the exposure of the mat to any impervious casing portion during separation. Thus, within a given space the rotary separator section can handle a greater amount of crop material then heretofore known.

A further important enhancement to the separation section is provided by the unique grate configuration in which askew sections of the transverse members aid in urging the crop along its rearward path without necessitating the provision of separate vanes. These askew sections cooperate with the spiral configuration of the blades and rasp bars in a new and unique manner resulting in improved operation implicit and explicit throughout this description While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A combine harvester comprising
   a. a mobile frame adapted to be propelled over a field of grain bearing crop material,
   b. a header carried by the frame extending forwardly therefrom, said header having means for removing the crop material from the field and delivering it in a generally rearward direction,
   c. infeed means mounted on the frame for receiving crop material from said header and conveying it in a generally rearward direction,
   d. at least one generally cylindrical unit for receiving material from said infeed means, said unit extending along said frame in a fore-and-aft direction, comprising a threshing section having a transversely curved concave and a separating section rearward of said concave,
   e. said cylindrical unit further comprising means for guiding said crop material rearwardly along a generaly helical path,
   f. means underneath at least a portion of said cylindrical unit for receiving grain, and
   g. a fore-and-aft extending rotor rotatably mounted in said cylindrical unit, said rotor including threshing means adjacent said concave and crop engaging means in said separating section for urging material rearwardly and effecting separating of grain from the crop material under conditions where said rotors are rotated,
   h. said separating section comprising a grate having a plurality of generally transverse members retained by spaced longitudinal elements defining a configuration of apertures permitting discharge of separated grain over a substantial portion of the circumference of the separating section all of said grain so discharged gravitating to said grain receiving means,
   i. one or more of said transverse members including at least one slightly askew section with respect to the rotor axis and in a direction adapted to guide crop material along said generally helical path.

2. A combine harvester, as set forth in claim 1, wherein said crop engaging means comprise a blade disposed along a path in a direction adapted to cooperate with said askew section in guiding crop material along its helical path.

3. A combine harvester, as set forth in claim 2, wherein said blade is disposed along a spiral path.

4. A combine harvester, as set forth in claim 1, and wherein said transverse members further comprise a plurality of askew sections in spaced side-by-side relationship and at least a portion of said spaced longitudinal elements extending between said sections to provide a configuration of apertures.

5. A combine harvester, as set forth in claim 4, wherein said transverse members further comprise rod members said askew sections, and said portion of said longitudinal elements ocmprise side-by-side bars through which said rod members are mounted.

6. A combine harvester, as set forth in claim 5, wherein the inner edges of said askew sections extend beyond the inner edges of said portion of said longitudinal elements.

7. In a combine harvester comprising
   a mobile frame adapted to be propelled over a field of grain bearing crop material,
   a header mounted on the frame extending forwardly therefrom, said header having means for removing the crop material from the field and delivering it in a generally rearward direction,
   infeed means for receiving crop material from said header and conveying it in a generally rearward direction,
   a generally cylindrical unit for receiving material from said infeed means, said unit extending along said frame in a generally fore-and-aft direction, comprising a threshng section having a transversely curved concave and a separating section rearward of said concave,
   said cylindrical unit further comprising means for guiding said crop material rearwardly along a generally helical path,
   underneath at least a portion of said cylindrical unit for receiving grain,
   a fore-and-aft extending rotor rotatably mounted in said cylindrical unit, said rotor including threshing means adjacent said concave and crop engaging means in said separating section for urging material rearwardly and effecting separation of grain from the crop material under conditions where said rotors are rotated, and
   said separating section of the cylindrical unit comprises a plurality of generally transverse members retained by spaced longitudinal elements defining a configuration of apertures permitting discharge of separated grain over a substantial portion of the circumference of the separating section, all of said grain so discharged gravitating to said grain receiving means, the improvement comprising selected transverse members arranged askew with respect to the rotor axis to guide said crop material along its generally helical path during separation in conjunction with said crop engaging means.

8. In a combine harvester, as set forth in claim 7, wherein said crop engaging means comprise a blade disposed along a path in a direction adapted to cooperate with said askew sections in guiding crop material along its helical path.

9. In a combine harvester, as set forth in claim 8, wherein said blade is disposed along a generally helical path.

10. In a combine harvester, as set forth in claim 7, wherein said selected transverse members further comprise a plurality of axially spaced planar members and at least a portion of said longitudinal elements extend in spaced relationship between said planar members.

11. In a combine harvester, as set forth in claim 10, wherein said transverse members further comprise rod members axially spaced at intervals between said planar members.

12. In a combine harvester, as set forth in claim 11, wherein said longitudinal elements comprise side-by-side bars having a series of holes through which said rod members are mounted.

13. In a combine harvester, as set forth in claim 7, the improvement further comprising a rotor having spirally disposed crop engaging means for urging crop material rearwardly along a helical path in cooperation with said selected transverse members.

14. In a combine harvester, as set forth in claim 7, the improvement further comprising said threshing means arranged along a generally helical path.

15. A combine harvester comprising
   a. a mobile frame adapted to be propelled over a field of grain bearing crop material,
   b. a header carried by the frame extending forwardly therefrom said header having means for removing the crop material from the field and delivering it in a generally rearward direction,
   c. infeed means for receiving crop material from said header and conveying it in a generally rearward direction,
   d. at least one generally cylindrical unit for receiving material from said infeed means, said unit extending along said frame in a fore-and-aft direction and comprising a threshing section and a separating section rearward of said threshing section,
   e. said cylindrical unit further comprising means for guiding said crop material rearwardly along a generally helical path,
   f. means underneath at least a portion of said cylindrical unit for receiving grain, and
   g. a fore-and-aft extending rotor rotatably mounted in said cylindrical unit, said rotor including threshing means in said threshing section and crop engaging means in said separating section for urging material rearwardly and imparting centrifugal force to said material to effect separation of grain from the crop material under conditions when said rotor is rotated,
   h. said separating section comprising a grate having a plurality of longitudinal elements retained by generally transverse members defining a configuration of apertures permitting discharge of separated grain, all of said grain so discharged gravitating to said grain receiving means,
   i. said threshing section comprising a concave mounted in operative relationship with said threshing means for threshing grain from said crop material under conditions where said rotor is rotated, and an auxiliary separating grain portion mounted above said concave to effect separation of grain from the crop material as it is advanced rearwardly along its helical path subsequent to its final traversal of the concave, said auxiliary separating grate is mounted along a portion of the upper edge of said concave and adjacent said separating section and comprises a plurality of longitudinal elements retained by generally transverse members defining a configuration of apertures through which separated grain is discharged as the crop material is advanced rearwardly along the portion of its helical path between said concave and said separating section, said generally transverse members in said auxiliary separating grate being in a plane askew with respect to the axis of said rotor to aid in guiding the crop material along its helical path.

16. In a combine as set forth in claim 15 wherein said threshing section of said rotor comprises a generally spirally arranged rasp bar for urging crop material along a helical path in cooperation with said auxiliary separating grate.

* * * * *